United States Patent
Momose

(10) Patent No.: US 10,118,609 B2
(45) Date of Patent: Nov. 6, 2018

(54) DRIVING FORCE CONTROL DEVICE FOR A VEHICLE

(71) Applicant: TOYOTA JIDOSHA KABUSHIKI KAISHA, Toyota-shi, Aichi (JP)

(72) Inventor: Hirofumi Momose, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 32 days.

(21) Appl. No.: 15/261,338

(22) Filed: Sep. 9, 2016

(65) Prior Publication Data

US 2017/0101087 A1    Apr. 13, 2017

(30) Foreign Application Priority Data

Oct. 13, 2015   (JP) .................................. 2015-201960

(51) Int. Cl.
*B60W 30/20* (2006.01)
*B60W 30/02* (2012.01)
(Continued)

(52) U.S. Cl.
CPC ............ *B60W 30/02* (2013.01); *B60W 30/18* (2013.01); *B60W 40/11* (2013.01); *B60W 30/20* (2013.01);
(Continued)

(58) Field of Classification Search
CPC .. B60W 30/02; B60W 40/11; B60W 2520/16; B60W 2520/28; B60W 2720/106; B60W 20/15; B60W 10/08
(Continued)

(56) References Cited

U.S. PATENT DOCUMENTS 8,825,291 B2 *   9/2014   Oikawa .................. B60K 6/445
                                                    701/37
9,079,579 B2 *   7/2015   Kikuchi ............. B60G 17/0195
(Continued)

FOREIGN PATENT DOCUMENTS

JP       2006-069472 A     3/2006
JP       2008231989 A      10/2008
(Continued)

OTHER PUBLICATIONS

Tokoro et al., An Application of State Feedback Control to Actual Vehicle Vibration Suppression, 2014, IEEE, p. 185-190.*
(Continued)

*Primary Examiner* — McDieunel Marc
(74) *Attorney, Agent, or Firm* — Oliff PLC

(57) ABSTRACT

A sprung vibration estimation unit is configured to calculate a pitch rate of a vehicle body based on the wheel speeds detected by wheel speed sensors. A vibration suppression driving force calculation unit is configured to calculate a vibration suppression driving force for suppressing pitching of the vehicle body based on the pitch rate. An integration unit is configured to calculate a vehicle body speed based on a driver required driving force. A second sprung vibration estimation unit is configured to calculate a pitch rate of the vehicle body (vehicle body speed pitch rate) generated by a change in the vehicle body speed. A determination unit is configured to output a cutoff command for the vibration suppression driving force to an adjustment unit when the vehicle body speed pitch rate is more than a threshold.

11 Claims, 8 Drawing Sheets

(51) Int. Cl.
*B60W 40/11* (2012.01)
*B60W 30/18* (2012.01)
(52) U.S. Cl.
CPC ..... *B60W 2520/16* (2013.01); *B60W 2520/28* (2013.01); *B60W 2710/105* (2013.01); *B60W 2720/106* (2013.01)
(58) Field of Classification Search
USPC .......................................................... 701/70
See application file for complete search history.

(56) References Cited

U.S. PATENT DOCUMENTS

| | | | |
|---|---|---|---|
| 9,187,080 B2* | 11/2015 | Kikuchi | B60T 8/17555 |
| 9,238,462 B2* | 1/2016 | Kikuchi | B60W 10/22 |
| 9,452,653 B2* | 9/2016 | Kikuchi | B60G 17/0195 |
| 2006/0052908 A1 | 3/2006 | Matsumoto et al. | |
| 2011/0213527 A1 | 9/2011 | Itabashi et al. | |
| 2011/0266760 A1 | 11/2011 | Itabashi | |
| 2012/0101691 A1 | 4/2012 | Otsuka et al. | |
| 2013/0231838 A1 | 9/2013 | Shiozawa et al. | |
| 2015/0046034 A1 | 2/2015 | Kikuchi | |
| 2016/0114644 A1* | 4/2016 | Morita | B60W 10/08 701/37 |
| 2017/0036669 A1* | 2/2017 | Kanou | B60W 20/15 |
| 2017/0113681 A1* | 4/2017 | Kanou | B60W 30/02 |

FOREIGN PATENT DOCUMENTS

| | | |
|---|---|---|
| JP | 2010-132254 A | 6/2010 |
| JP | 2011017303 A | 1/2011 |
| JP | 2012-047553 A | 3/2012 |
| WO | 2010-050070 A1 | 5/2010 |

OTHER PUBLICATIONS

Abeysiriwardhana et al., Simulation of Active Vibration Suppression Using Internal Motor Sensing, 2014, IEEE, p. 1-6.*
Yamaura et al., A reduced order model for an electrified vehicle and application to vibration suppression control, 2013, IEEE, p. 2212-2219.*
U.S. Appl. No. 15/266,383, filed Sep. 15, 2016 in the name of Kanou.

* cited by examiner

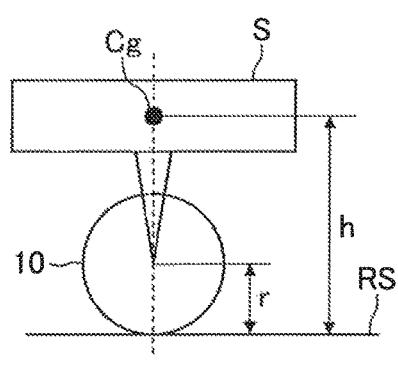 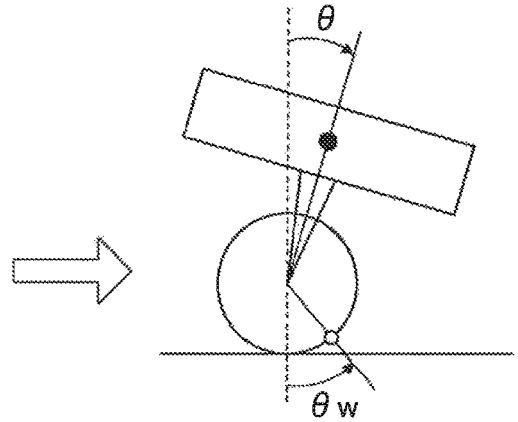
FIG.4A  FIG.4B
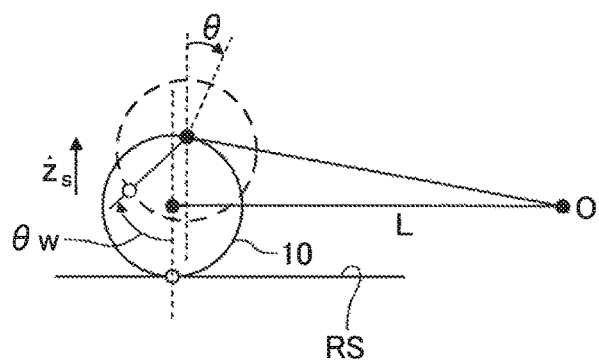
FIG.5

DRIVING FORCE CONTROL DEVICE FOR A VEHICLE

BACKGROUND OF THE INVENTION

1. Field of the Invention

The present invention relates to a driving force control device for a vehicle, which is configured to control driving forces to be generated on wheels so that a sprung vibration is suppressed.

2. Description of the Related Art

Hitherto, there has been known sprung vibration damping control of controlling driving forces to be generated on wheels, to thereby suppress a vibration of a vehicle body, namely, a sprung vibration. For example, in a device proposed in Japanese Patent Application Laid-open No. 2012-47553, the sprung vibration is estimated based on a change in a wheel speed detected by a wheel speed sensor, and a torque of a motor, which is a travel driving source of an electric vehicle, is calculated so that the sprung vibration is suppressed.

However, the change in the wheel speed detected by the wheel speed sensor is caused not only by irregularities of a road surface but also by a change in a vehicle body speed. In this case, an estimation accuracy of the sprung vibration to be generated by the irregularities of the road surface is decreased, and, on the contrary, inappropriate driving force control may be carried out.

SUMMARY OF THE INVENTION

The present invention has been made to cope with the above-mentioned problem, and therefore has an object to prevent inappropriate driving force control from being carried out in a driving force control device configured to suppress a sprung vibration estimated based on wheel speeds.

In order to achieve the above-mentioned object, a feature of one embodiment of the present invention resides in a driving force control device for a vehicle, including:

wheel speed detection means (62) for detecting a wheel speed;

sprung vibration estimation means (121) for estimating, based on the wheel speed, a sprung vibration to be generated in a pitch direction of a vehicle body due to an input from a road surface;

vibration suppression driving force calculation means (122) for calculating a vibration suppression driving force for suppressing the estimated sprung vibration;

target driving force calculation means (130) for calculating a target driving force acquired by adding the vibration suppression driving force to a driver required driving force to be set depending on a driver required acceleration/deceleration;

driving force control means (50) for controlling a driving force to be generated on a wheel in accordance with the target driving force;

error indication value calculation means (124, 125) for calculating, based on the driver required acceleration/deceleration, an error indication value representing a magnitude of an error, which is included in an estimation of the sprung vibration and is generated by a change in a vehicle body speed; and vibration suppression driving force adjustment means (123, 126) for decreasing, based on the error indication value, the vibration suppression driving force to be added to the driver required driving force in a case where the error indication value is large compared with a case where the error indication value is small.

In this case, it is preferred that the vibration suppression driving force adjustment means be configured to prevent the vibration suppression driving force from being added to the target driving force when the error indication value is more than a threshold. Alternatively, it is preferred that the vibration suppression driving force adjustment means be configured to correct the vibration suppression driving force to be added to the driver required driving force so that the vibration suppression driving force is decreased as the error indication value is increased.

The driving force control device for a vehicle according one embodiment of to the present invention is a device configured to control the driving force to be generated on the wheel so that the sprung vibration to be generated in the pitch direction of the vehicle body, namely, a pitch vibration may be suppressed, and includes the wheel speed detection means, the sprung vibration estimation means, the vibration suppression driving force calculation means, the target driving force calculation means, the driving force control means, the error indication value calculation means, and the vibration suppression driving force adjustment means.

The wheel speed detection means is configured to detect the wheel speed. For example, the wheel speed detection means is a wheel speed sensor including a sensor main body portion fixed to a vehicle body side, and a rotor portion fixed to a wheel side, and is configured to detect the wheel speed based on a change in a relative position in a rotational direction of the rotor portion with respect to the sensor main body portion. When the wheel receives an input from the road surface, the wheel speed changes. Thus, the sprung vibration estimation means estimates, based on the wheel speed, the sprung vibration to be generated in the pitch direction of the vehicle body due to the input from the road surface.

The vibration suppression driving force calculation means is configured to calculate the vibration suppression driving force for suppressing the estimated sprung vibration. For example, the vibration suppression driving force calculation means is configured to calculate the vibration suppression driving force acting in a direction of an acceleration of the vehicle when the vehicle body pitches in a direction of a nose-down, and, conversely, calculate the vibration suppression driving force acting in a direction of a deceleration of the vehicle when the vehicle body pitches in a direction of a nose-up.

The target driving force calculation means is configured to calculate the target driving force acquired by adding the vibration suppression driving force to the driver required driving force to be set depending on the driver required acceleration/deceleration. The driving force control means is configured to control the driving force to be generated on the wheel in accordance with the target driving force. As a result, the vibration in the pitch direction of the vehicle body is suppressed.

In the configuration of estimating, based on the wheel speeds, the sprung vibration to be generated in the pitch direction of the vehicle body due to the input from the road surface, when the vehicle body speed fluctuates, a component caused by the fluctuation of the vehicle body speed is superimposed on the wheel speed, and the estimation of the sprung vibration by the sprung vibration estimation means may become inaccurate.

Thus, the error indication value calculation means is configured to calculate, based on the driver required acceleration/deceleration, the error indication value representing the magnitude of the error, which is included in the estimation of the sprung vibration and is generated by the change in the vehicle body speed. The driver required acceleration/deceleration can be detected, for example, by a driver required driving force calculated based on an accelerator operation amount. When the driver required acceleration/deceleration is stable, the change in the vehicle body speed is small, and the error included in the estimation of the sprung vibration is thus small. Conversely, when the driver required acceleration/deceleration changes large, the change in the vehicle body speed is large, and the error included in the estimation of the sprung vibration is thus large.

The vibration suppression driving force adjustment means is configured to decrease, based on the error indication value, the vibration suppression driving force to be added to the driver required driving force in a case where the error indication value is large compared with a case where the error indication value is small. For example, when the error indication value is more than the threshold, the vibration suppression driving force adjustment means prevents the vibration suppression driving force from being added to the target driving force. Alternatively, the vibration suppression driving force adjustment means corrects the vibration suppression driving force to be added to the driver required driving force so that the vibration suppression driving force is decreased as the error indication value is increased. Thus, according to the present invention, in the driving force control device configured to suppress the sprung vibration estimated based on the wheel speeds, inappropriate driving force control can be prevented from being carried out.

A feature of one embodiment of the present invention resides in that the sprung vibration estimation means is configured to calculate a pitch rate of the vehicle body as the sprung vibration, and the vibration suppression driving force calculation means is configured to calculate, based on the calculated pitch rate, the vibration suppression driving force proportional in a magnitude to the pitch rate.

According to the one embodiment of the present invention, the vibration suppression driving force the magnitude of which is proportional to the pitch rate of the vehicle body calculated by the sprung vibration estimation means is calculated, and the pitch vibration of the vehicle body can thus be appropriately suppressed.

A feature of one embodiment of the present invention resides in that the error indication value calculation means is configured to integrate (124) a value representing the driver required acceleration/deceleration, thereby calculating a value corresponding to the vehicle body speed, and to calculate (125), as the error indication value, a pitch rate of the vehicle body generated by the change in the vehicle body speed, based on a value corresponding to the calculated vehicle body speed.

According to the one embodiment of the present invention, the error indication value calculation means is configured to integrate the value representing the driver required acceleration/deceleration, thereby calculating the value corresponding to the vehicle body speed. Further, the error indication value calculation means is configured to calculate, based on the value corresponding to the calculated vehicle body speed, the pitch rate of the vehicle body generated by the change in the vehicle body speed. The pitch rate is used as the error indication value. Thus, the error included in the estimation of the sprung vibration can be appropriately estimated.

A feature of one embodiment of the present invention resides in that the error indication value calculation means is configured to integrate (124) a value representing the driver required acceleration/deceleration, thereby calculating a value corresponding to the vehicle body speed, extract (125') a change component of a value corresponding to the calculated vehicle body speed, and multiply a magnitude of the change component by a vehicle speed gain, which is decreased as the vehicle body speed is increased, thereby calculating the error indication value.

According to the one embodiment of the present invention, the error indication value is calculated by multiplying the magnitude of the change component of the value corresponding to the vehicle body speed by the vehicle speed gain, which is decreased as the vehicle body speed is increased. The reason for this setting of the vehicle speed gain is that the ratio of the pitch vibration component to the vibration of the vehicle body is decreased as the vehicle body speed is increased. As a result, the error indication value can be calculated while a calculation load is decreased.

A feature of one embodiment of the present invention resides in that:

the sprung vibration estimation means (121) is configured to calculate a pitch rate of the vehicle body as the sprung vibration;

the error indication value calculation means includes:

first level detection means (127) for detecting a level of the pitch rate calculated by the sprung vibration estimation means;

second level detection means (124, 125, 128) for integrating a value representing the driver required acceleration/deceleration, thereby calculating a value corresponding to the vehicle body speed, calculating, based on a value corresponding to the calculated vehicle body speed, a pitch rate of the vehicle body generated by the change in the vehicle body speed, and detecting a level of the calculated pitch rate; and SN ratio calculation means (129) for calculating an SN ratio acquired by dividing a value, which is acquired by subtracting a second value (Nb) representing the level of the pitch rate detected by the second level detection means from a first value (S+Na) representing the level of the pitch rate detected by the first level detection means, by the second value;

the error indication value calculation means is configured to acquire the error indication value, which corresponds to the SN ratio, and the error can be estimated to become larger as the error indication value becomes smaller.

According to the one embodiment of the present invention, the sprung vibration estimation means is configured to calculate the pitch rate of the vehicle body as the sprung vibration. The error indication value calculation means includes the first level detection means, the second level detection means, and the SN ratio calculation means. The first level detection means is configured to detect the level of the pitch rate calculated by the sprung vibration estimation means. The second level detection means is configured to integrate the value representing the driver required acceleration/deceleration, thereby calculating the value corresponding to the vehicle body speed, to calculate, based on the calculated value corresponding to the vehicle body speed, the pitch rate of the vehicle body generated by the change in the vehicle body speed, and to detect the level of the calculated pitch rate. As the levels of the two pitch rates, for example, values represented by envelope detection signals of the respective pitch rates may be used.

The SN ratio calculation means is configured to calculate the SN ratio based on the first value representing the level of the pitch rate detected by the first level detection means and the second value representing the level of the pitch rate detected by the second level detection means. The S/N ratio is acquired by dividing the value acquired by subtracting the second value from the first value by the second value.

Thus, the error indication value calculation means is configured to acquire the error indication value, which corresponds to the SN ratio by this calculation of the SN ratio. In this case, the error can be estimated to become larger as the error indication (the SN ratio) value becomes smaller. As a result, according to the one embodiment of the present invention, the magnitude of the error included in the pitch rate calculated by the sprung vibration estimation means can be more appropriately estimated.

In the description above, a reference symbol used in an embodiment of the present invention is enclosed in parentheses and assigned to each constituent feature of the invention corresponding to the embodiment in order to facilitate the understanding of the invention, but each constituent feature of the invention is not limited to that of the embodiment prescribed by the reference symbol.

BRIEF DESCRIPTION OF THE DRAWINGS

FIG. 4A and FIG. 4B are diagrams for illustrating an influence amount of a pitch about the center of gravity of a vehicle body, which is an element influencing a wheel speed.

FIG. 5 is a diagram for illustrating an influence amount of a suspension geometry, which is an element influencing the wheel speed.

DETAILED DESCRIPTION OF THE PREFERRED EMBODIMENTS

Figure 1:
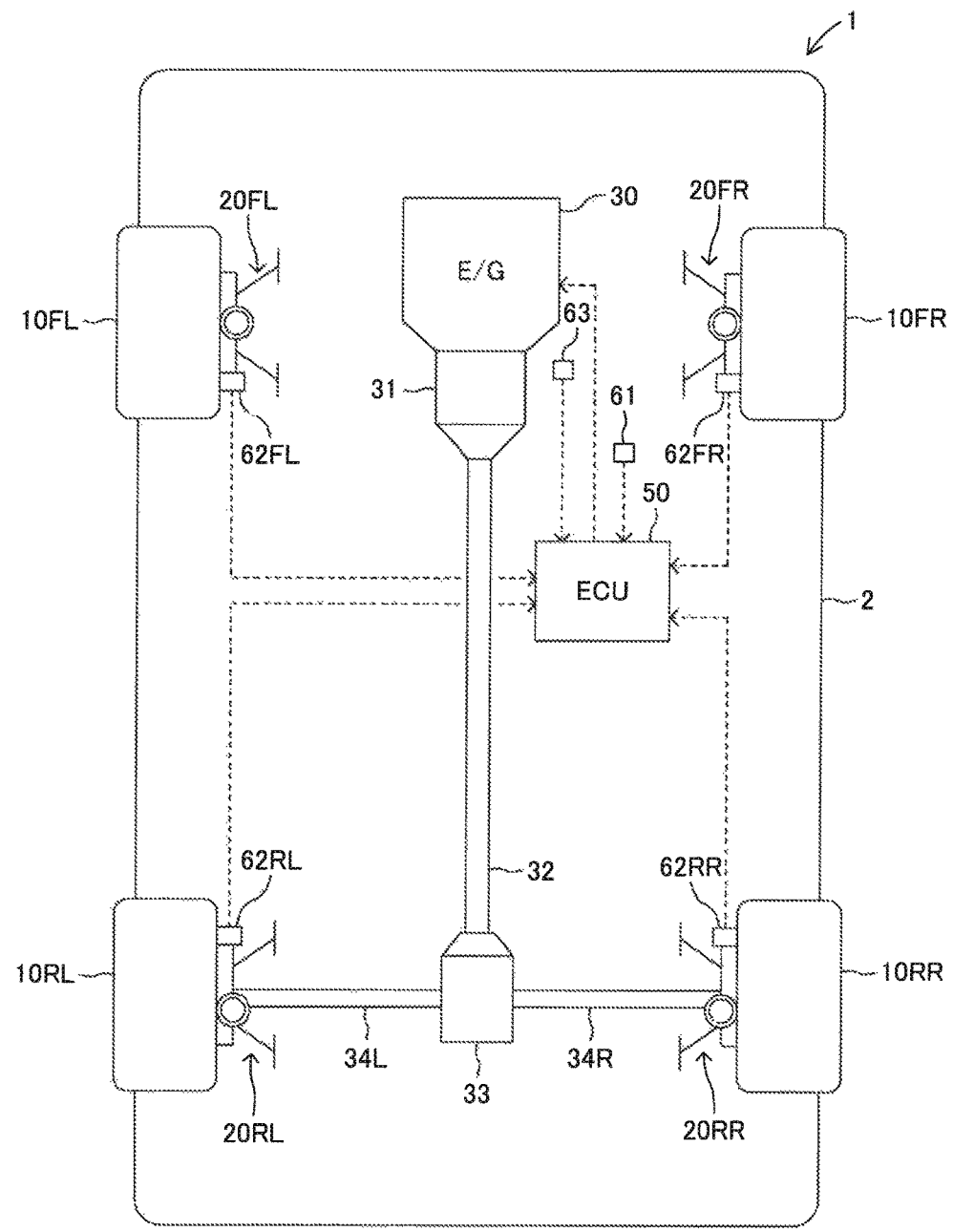
FIG. 1 is a schematic configuration diagram of a vehicle on which a driving force control device for a vehicle according to an embodiment of the present invention is installed.

A detailed description is now given of an embodiment of the present invention referring to the drawings. FIG. 1 is a schematic illustration of a configuration of a vehicle 1 on which a driving force control device for a vehicle according to this embodiment is installed.

The vehicle 1 includes a front left wheel 10FL, a front right wheel 10FR, a rear left wheel 10RL, and a rear right wheel 10RR. The front left wheel 10FL, the front right wheel 10FR, the rear left wheel 10RL, and the rear right wheel 10RR are suspended to a vehicle body 2 via independent suspensions 20FL, 20FR, 20RL, and 20RR, respectively.

The suspensions 20FL, 20FR, 20RL, and 20RR include suspension arms (link mechanisms) configured to couple the vehicle body 2 and the wheels 10FL, 10FR, 10RL, and 10RR to each other, respectively, suspension springs configured to support loads in a vertical direction and absorb impact, and shock absorbers configured to attenuate a vibration of a sprung (vehicle body 2). A publicly known four-wheel independent suspension such as a wishbone type suspension and a strut type suspension can be used as the suspensions 20FL, 20FR, 20RL, and 20RR.

In the following, when a specific one of the respective wheels 10FL, 10FR, 10RL, and 10RR, and/or a specific one of the respective suspensions 20FL, 20FR, 20RL, and 20RR does not need to be identified, the wheels and the suspensions are collectively referred to as wheel 10 and suspension 20, respectively. Moreover, the wheels 10FL and 10FR are referred to as front wheels 10F, and the wheels 10RL and 10RR are referred to as rear wheels 10R. Moreover, the suspensions 20FL and 20FR are referred to as front suspensions 20F, and the suspensions 20RL and 20RR are referred to as rear suspensions 20R.

The vehicle 1 according to this embodiment is a rear wheel drive vehicle, and includes an engine 30 as a travel driving source. As the engine 30, a gasoline engine, a diesel engine, or the like can be used. The vehicle 1 may be an electric vehicle including a motor in place of the engine as the travel driving source, a hybrid vehicle including a combination of the engine and the motor, or the like. Moreover, the vehicle 1 is not limited to the rear wheel drive vehicle, and may be a front wheel drive vehicle or a four wheel drive vehicle.

Now, a description is given of a driving force control device for a vehicle including the engine 30 as the travel driving source, but in this specification, the expression of the engine 30 can be replaced by the expression of the travel driving source. Moreover, a sensor relating to the engine 30, a sensor value detected by the sensor, an actuator configured to operate the engine, and the like can be replaced by expressions of a sensor relating to the travel driving source used in place of the engine 30, a sensor value detected by the sensor relating to the travel driving source, and an actuator configured to operate the travel driving source.

A driving torque of the engine 30 is transmitted to a propeller shaft 32 via a transmission 31. The torque of the propeller shaft 32 is transmitted to the rear wheels 10RL and 10RR via a differential device 33 and drive shafts 34L and 34R.

The engine 30 is connected to an electric control unit (ECU) 50. The ECU 50 includes a microcomputer as a main component. In this specification, the microcomputer includes a CPU and storage devices, e.g., a ROM and a RAM.

To the ECU 50, an accelerator pedal sensor 61, wheel speed sensors 62FL, 62FR, 62RL, and 62RR, and an engine state sensor 63 are connected. The accelerator pedal sensor 61 is configured to detect an accelerator operation amount, which is an amount of a depressing operation and a return operation on the accelerator pedal by the driver, and to output a detection signal representing the accelerator operation amount to the ECU 50. The wheel speed sensors 62FL, 62FR, 62RL, and 62RR are respectively provided on the wheels 10FL, 10FR, 10RL, and 10RR, and are configured to detect the respective wheel speeds, and to output detection signals representing each of the wheel speeds to the ECU 50. The four wheel speed sensors 62FL, 62FR, 62RL, and 62RR are hereinafter collectively referred to as wheel speed sensor 62.

The wheel speed sensor 62 includes, for example, a sensor main body portion fixed to a vehicle body side (carrier configured to rotationally support the wheel), and a rotor portion fixed to the wheel 10 and configured to rotate along with the wheel 10 (magnetic rotor according to this embodiment), which are not illustrated. The wheel speed sensor 62 is configured to use the sensor main body portion to detect a change in a magnetic field generated by magnetic poles (N and S poles) arranged on a periphery of the rotor portion. The wheel speed sensor 62 is configured to detect a change in a relative position (relative angle) in a rotational direction of the rotor portion with respect to the sensor main body portion based on the change in the magnetic field, to thereby detect the rotational speed (wheel angular velocity) of the wheel 10 based on a change amount of the relative angle per unit time. The wheel speed (m/s) is acquired by multiplying the wheel angular velocity (rad/s) by the tire rolling radius. Therefore, the wheel speed and the wheel angular velocity correspond to each other, and, thus, hereinafter even the expression of the wheel speed may imply the wheel angular velocity.

The engine state sensor 63 includes a plurality of sensors configured to detect states of the engine 30 and the transmission 31, and to respectively output detection signals representing detected detection values to the ECU 50. For example, the engine state sensor 63 is configured to detect an engine rotational speed, a coolant temperature, an intake air temperature, an intake air pressure, the atmospheric pressure, a throttle opening degree, a shift gear position, and the like.

The ECU 50 is configured to operate actuators (not shown) based on the detection signals output from those sensors, thereby adjusting the driving torque of the engine 30.

The vehicle 1 includes a steering device configured to adjust a steered angle of steered wheels, and a brake device configured to generate friction braking forces on the wheels, but the steering device and the brake device do not directly relate to the present invention, and thus in this specification and the drawings description(s) thereof is omitted.

A description is now given of sprung vibration damping control carried out by the ECU 50. When disturbance acts on the wheels 10 by irregularities of a road surface and the like during the travel of the vehicle 1, the disturbance is transmitted to the vehicle body 2 via the suspensions 20. As a result, the vehicle body 2 vibrates with a frequency in the vicinity of a sprung resonance frequency (e.g., 1.5 Hz). This vibration of the vehicle body 2 is referred to as sprung vibration. The sprung vibration includes a component in a vertical direction (z direction) at a position of the center of gravity of the vehicle (referred to as bounce vibration), and a component in a pitch direction (θ direction) about a lateral axis passing through the center of gravity of the vehicle (referred to as pitch vibration).

For the pitch vibration, a force in a direction of suppressing the pitch vibration can be generated on the vehicle body 2 by changing the driving torque (driving forces to be generated on the wheels) of the engine 30 synchronously with the pitch vibration. Thus, the ECU 50 is configured to set, to a target driving force, a value acquired by adding a pitch suppression driving force, which is a vibration suppression driving force for suppressing the pitch vibration, to a driver required driving force. The ECU 50 is configured to then control the driving torque of the engine 30 so that the wheels 10 generate the target driving force. The driver required driving force represents a force required by the driver to accelerate or decelerate the vehicle.

According to this embodiment, the pitch suppression driving force is calculated based on the wheel speeds detected by the wheel speed sensors 62, but, as described later, when the wheel speed includes a fluctuation component of the vehicle body speed, the pitch suppression driving force cannot be appropriately calculated. Therefore, when the pitch suppression driving force is calculated, the ECU 50 calculates an error indication value representing the magnitude of the error, which is included in the estimation of the sprung vibration and is generated by a change in the vehicle body speed, and suspends the sprung vibration damping control using the pitch suppression driving force, or corrects the sprung vibration damping control amount based on the error indication value.

Figure 2:
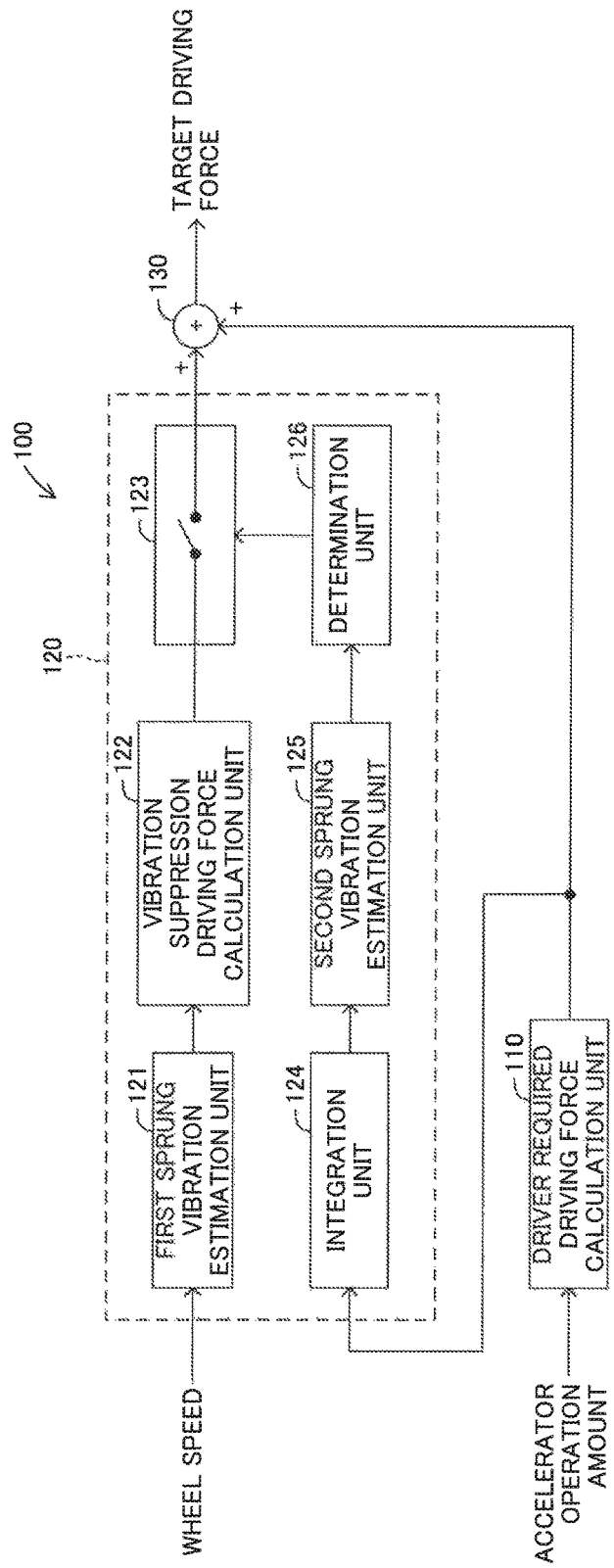
FIG. 2 is a functional block diagram of a target driving force calculation unit.

FIG. 2 is an illustration of functional blocks of a target driving force calculation unit 100 configured to calculate the target driving force. The respective blocks in the target driving force calculation unit 100 are implemented by the CPU of the microcomputer provided in the ECU 50 executing instructions (programs) stored in the ROM.

The target driving force calculation unit 100 includes a driver required driving force calculation unit 110, a sprung vibration damping control amount calculation unit 120, and an addition unit 130. The driver required driving force calculation unit 110 is configured to calculate the driver required driving force based on the accelerator operation amount detected by the accelerator pedal sensor 61, which represents the driver required acceleration/deceleration. For example, the driver required driving force calculation unit 110 stores a driver required driving force map for setting the driver required driving force, which is increased as the accelerator operation amount is increased, and is configured to use this driver required driving force map to set the driver required driving force.

The sprung vibration damping control amount calculation unit 120 is configured to calculate the pitch suppression driving force, which is the vibration suppression driving force for suppressing the pitch vibration of the vehicle body 2. The driver required driving force calculated by the driver required driving force calculation unit 110 and the pitch suppression driving force calculated by the sprung vibration damping control amount calculation unit 120 are input to the addition unit 130, and the addition unit 130 sets the sum of the pitch suppression driving force and the driver required driving force to the target driving force.

A description is now given of the sprung vibration damping control amount calculation unit 120. The sprung vibration damping control amount calculation unit 120 includes a first sprung vibration estimation unit 121, a vibration suppression driving force calculation unit 122, an adjustment unit 123, an integration unit 124, a second sprung vibration estimation unit 125, and a determination unit 126.

The first sprung vibration estimation unit 121 is configured to estimate, based on the wheel speeds (changes in the wheel speeds) detected by the wheel speed sensors 62, the sprung vibration (pitch vibration) generated in the vehicle body 2 in the pitch direction due to the inputs from the road surface. The first sprung vibration estimation unit 121 is configured to calculate the pitch rate, which is a derivative $d\theta/dt$ of a pitch angle $\theta$ of the vehicle body, as a value representing the sprung vibration. A calculation method for the pitch rate is detailed later.

The vibration suppression driving force calculation unit 122 is configured to calculate the vibration suppression driving force, which is a driving force acting in a direction of decreasing the pitch rate, based on the pitch rate calculated by the first sprung vibration estimation unit 121. The vibration suppression driving force is set to a magnitude proportional to the pitch rate calculated by the first sprung vibration estimation unit 121. For example, in the case where the pitch rate is represented as a positive value when the pitch angle is increased toward a direction of a nose-down of the vehicle body 2, and the pitch rate is represented as a negative value when the pitch angle is increased toward a direction of a nose-up of the vehicle body 2, the vibration suppression driving force calculation unit 122 calculates the vibration suppression driving force by multiplying the pitch rate by a positive gain $\alpha$.

Thus, when the vehicle body 2 pitches toward the direction of the nose-down, the vibration suppression driving force toward a direction of accelerating the vehicle is calculated. As a result, a pitch moment can be applied to the vehicle body 2 so that the vehicle body 2 pitches toward the direction of the nose-up, and the pitch rate of the vehicle body 2 can be decreased, that is, the pitch vibration can be suppressed. Similarly, when the vehicle body 2 pitches toward the direction of the nose-up, the vibration suppression driving force toward a direction of decelerating the vehicle is calculated. As a result, the pitch moment can be applied to the vehicle body 2 so that the vehicle body 2 pitches toward the direction of the nose-down. The above-mentioned pitch moment is generated in a magnitude that is proportional to the gain $\alpha$, and thus a gain $\alpha$ that can minimally suppress the pitch vibration is set in advance.

The adjustment unit 123 is a switch configured to cut off the vibration suppression driving force calculated by the vibration suppression driving force calculation unit 122, and stops the output of the vibration suppression driving force to the addition unit 130 while a cutoff command is output from the determination unit 126 described later. The output of the adjustment unit 123 corresponds to the output of the sprung vibration damping control amount calculation unit 120 (namely, the pitch suppression driving force). Thus, when the cutoff command is output from the determination unit 126, the pitch suppression driving force is zero, and the target driving force is thus equal to the driver required driving force. As a result, the sprung vibration damping control is temporarily stopped. Moreover, when the cutoff command is not output from the determination unit 126, the adjustment unit 123 outputs the vibration suppression driving force calculated by the vibration suppression driving force calculation unit 122 as the pitch suppression driving force. Thus, the target driving force is the sum of the pitch suppression driving force (vibration suppression driving force) and the driver required driving force. As a result, the sprung vibration damping control is implemented.

The first sprung vibration estimation unit 121 is configured to calculate the pitch rate of the vehicle body 2 based on the wheel speeds, and the pitch rate is calculated on the assumption that the vehicle body speed is constant as described later. Thus, when the vehicle body speed fluctuates, a component caused by the fluctuation of the vehicle body speed is superimposed on the wheel speeds, and thus an appropriate pitch rate may not be calculated. Thus, in order to estimate the magnitude of a noise (error), which is included in the estimation of the sprung vibration and is generated by the change in the vehicle body speed, the integration unit 124 and the second sprung vibration estimation unit 125 are provided in the sprung vibration damping control amount calculation unit 120. Moreover, the determination unit 126 configured to output the cutoff command to the adjustment unit 123 when the noise included in the estimation of the sprung vibration is more than a threshold is also provided in the sprung vibration damping control amount calculation unit 120.

A detailed description is now given of the first sprung vibration estimation unit 121. The first sprung vibration estimation unit 121 is configured to apply a predetermined inverse matrix to the wheel speeds detected by the wheel speed sensors 62, thereby calculating estimated values of the road surface inputs to the wheels 10, and to apply a vehicle kinetic model matrix to the calculated estimated values of the road surface inputs, thereby calculating an estimated value of a vehicle body state amount. On this occasion, the predetermined inverse matrix is an inverse matrix of a product of a vehicle kinetic model matrix representing a dynamic vehicle kinetic model of the vehicle and a wheel speed influence element model matrix representing a wheel speed influence element model including elements influencing the wheel speeds.

Figure 3A:
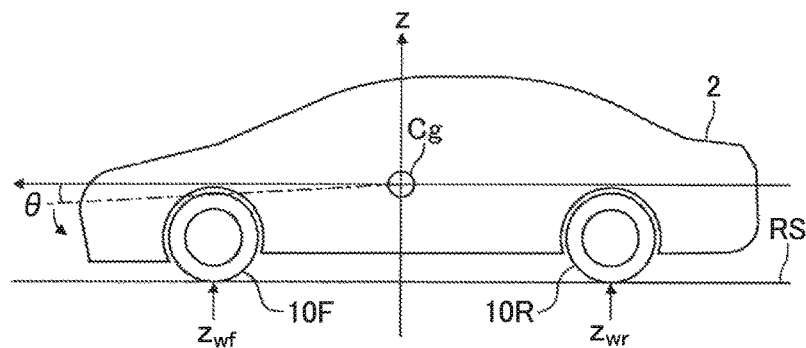
FIG. 3A and FIG. 3B are diagrams for illustrating a dynamic vehicle kinetic model.
Figure 3B:
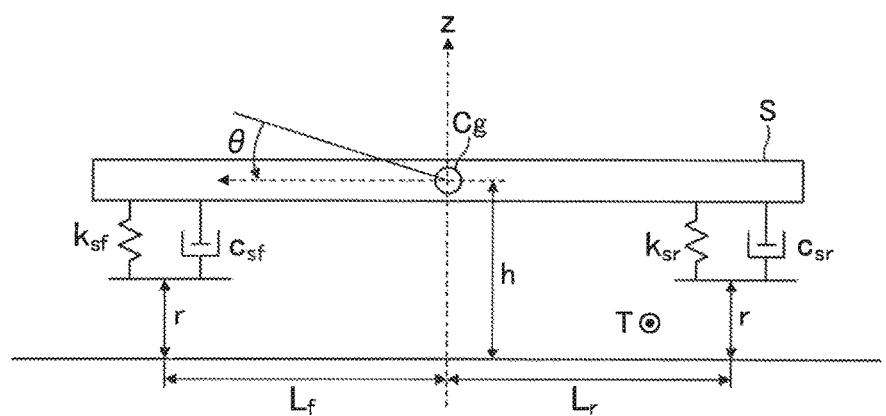

First, a description is given of the dynamic vehicle kinetic model of the vehicle. FIG. 3A and FIG. 3B are diagrams for illustrating an example of the dynamic vehicle kinetic model of the vehicle used in the first sprung vibration estimation unit.

The bounce vibration (vibration in a bounce direction) of the center of gravity Cg of the vehicle body 2 in a vertical direction (z direction) and the pitch vibration (vibration in a pitch direction) of the vehicle body 2 in a pitch direction ($\theta$ direction) about the center of gravity are defined as illustrated in FIG. 3A. This model is a two-wheel model using the front wheel 10F and the rear wheel 10R to represent the wheels. Symbols $z_{wf}$ and $z_{wr}$ represent road surface inputs from a road surface RS to the front wheel 10F and the rear wheel 10R, and are specifically displacements of the road surface RS in the z direction.

As illustrated in FIG. 3B, the dynamic vehicle kinetic model in the bounce direction or the pitch direction of the vehicle body 2 assumes, for example, that the vehicle body 2 is a rigid body S having a mass $M_b$ and a moment of inertia $I_p$, and the rigid body S is supported by the front suspension 20F having an elastic modulus $k_{sf}$ and a damping factor $c_{sf}$ and the rear suspension 20R having an elastic modulus $k_{sr}$ and a damping factor $c_{sr}$ (sprung vibration model of vehicle body 2). Symbol r denotes the radius of the wheel. Symbol h denotes the height of the center of gravity Cg from the road surface. Symbols $L_f$ and $L_r$ respectively denote distances from the center of gravity Cg to a front axle and a rear axle. Symbol T denotes a driving torque applied to the rear wheel. In this case, an equation of motion in the bounce direction (dynamic kinetic model in the bounce direction) and an equation of motion in the pitch direction (dynamic kinetic model in the pitch direction) of the center of gravity Cg of the vehicle body 2 can be represented as Expression 1.

$$M_b \ddot{z}_b = 2F_{zf} + 2F_{zr}$$

$$I_p \ddot{\theta}_p = -2F_{zf}L_f + 2F_{zr}L_r$$

$$F_{zf} = k_{sf} z_{sf} + c_{sf} \dot{z}_{sf}$$

$$F_{zr} = k_{sr} z_{sr} + c_{sr} \dot{z}_{sr} \quad (1)$$

In Expression (1), $z_b$ denotes the coordinate in the z direction of the center of gravity Cg, $z_{sf}$ and $z_{sr}$ respectively denote the coordinates in the z direction of the centers of the wheels 10F and 10R, and $F_{zf}$ and $F_{zr}$ respectively denote forces acting to the wheels 10F and 10R from the road surface. Symbol $\theta_p$ denotes a pitch angle of the vehicle body 2 about the center of gravity. Symbols $z_{sf}$, $z_{sr}$, $z_{bf}$, and $z_{br}$ can be represented as Expression (2). Symbols $z_{bf}$ and $z_{br}$ are respectively coordinates of a line passing through the center of gravity Cg and being parallel with the lengthwise direction of the vehicle 1 on the front axle and the rear axle.

$$z_{sf} = z_{wf} - z_{bf}$$

$$z_{sr} = z_{wr} - z_{br}$$

$$z_{bf} = z_b - \theta_p L_f$$

$$z_{br} = z_b + \theta_p L_r \quad (2)$$

On this occasion, $d\theta/dt$, which is the vehicle body state amount, and the state variables $F_{zf}$, $F_{zr}$, $dz_{sf}/dt$, and $dz_{sr}/dt$ can be represented by using $z_{wf}$, $z_{wr}$ and a predetermined matrix A(t), and the Laplace transform of this expression can be represented as Expression (3). On this occasion, $s=j\omega$.

$$\begin{pmatrix} \theta \\ F_{zf} \\ F_{zr} \\ z_{sf} \\ z_{sr} \end{pmatrix} = A(s) \begin{pmatrix} z_{wf} \\ z_{wr} \end{pmatrix} \quad (3)$$

A matrix A(s) is a 5×2 matrix. The matrix A(s) can be represented as Expression (6) by using $T_f$ and $T_r$ represented as Expression (4), and matrices A1, B1, C1, D1, E1, and F1 represented as Expression (5). Values $d\theta/dt$, $dz_{sf}/dt$, and $dz_{sr}/dt$ are transformed to $\theta s$, $z_{sf}s$, and $z_{sr}s$ through the Laplace transform, and, in Expression (4), s is included in the matrix A(s). The matrix A(s) is hereinafter abbreviated to matrix A.

$$T_f = k_{sf} + c_{sf}s \quad (4)$$

$$T_r = k_{sr} + c_{sr}s$$

$$A1 = [-2T_f L_f + 2T_r L_r \quad I_p s^2 + 2T_f L_f^2 + 2T_r L_r^2], \quad (5)$$

$$C1 = \begin{bmatrix} -T_f & T_f L_f \\ -T_r & -T_r L_r \end{bmatrix}, \quad E1 = \begin{bmatrix} -1 & L_f \\ -1 & -L_r \end{bmatrix},$$

$$B1 = [-2T_f L_f \quad 2T_r L_r], \quad D1 = \begin{bmatrix} T_f \\ T_r \end{bmatrix}, \quad F1 = \begin{bmatrix} 1 \\ 1 \end{bmatrix}$$

$$A(s) = \begin{bmatrix} A1^T B1 \\ C1 A1^T B1 + D1 \\ E1 A1^T B1 + F1 \end{bmatrix} \quad (6)$$

The matrix A is a vehicle kinetic model matrix representing the dynamic vehicle kinetic model of the vehicle, and can be applied to the road surface inputs to calculate the vehicle body state amount (refer to Expression (3)).

A description is now given of the wheel speed influence element model. The wheel speed sensor 62 includes the sensor main body portion fixed to the vehicle body 2 (carrier configured to rotationally support the wheel), and the rotor portion fixed to the wheel 10 and configured to rotate along with the wheel 10, (for example, a magnetic rotor), which are widely known and are thus not shown. The wheel speed sensor 62 is configured to detect the wheel speed based on the change in the relative position (relative angle) in the rotational direction of the rotor portion with respect to the sensor main body portion. Thus, when the vehicle body 2 pitches about the center of gravity, the relative position in the rotational direction between the sensor main body portion and the rotor portion changes. Moreover, when a vertical position of the wheel 10 with respect to the vehicle body 2 changes, the wheel 10 is moved in a longitudinal direction due to a suspension geometry (the wheel 10 is swung by a suspension link mechanism, and the wheel 10 consequently moves in the longitudinal direction), and the relative position in the rotational direction between the sensor main body portion and the rotor portion changes. Moreover, when a vertical load acting on the wheel 10 changes, a dynamic load radius of a tire changes, and the rotational speed of the wheel thus changes.

Thus, as elements influencing the wheel speed (elements changing the wheel speed), there are conceivable three wheel speed influence elements, specifically, 1. influence of the pitch about the center of gravity of the vehicle body,
2. influence of the suspension geometry, and
3. influence of the wheel rolling radius change.

A description is now given of a model for a case including those three wheel speed influence elements.

FIG. 4A and FIG. 4B are diagrams for illustrating an influence amount of the pitch about the center of gravity of the vehicle body, which is the element influencing the wheel speed. As illustrated in FIG. 4A and FIG. 4B, when the vehicle body pitches about the center of gravity, and two rotational angles generated by the pitching, namely, a rotational angle of the carrier to which the sensor main body portion of the wheel speed sensor is mounted and a rotational angle of the wheel 10 caused by the longitudinal movement of the wheel 10 are respectively represented as $\theta$ and $\theta_w$, the influence amount of the pitching about the center of gravity of the vehicle body on the wheel angular velocity is approximated by Expression (7) as an angular velocity $\omega_{body}$.

$$\omega_{body} = -(\dot{\theta}_w + \dot{\theta}) \quad (7)$$

$$= -\left(\frac{h-r}{r}\dot{\theta} + \dot{\theta}\right)$$

$$= -\frac{h}{r}\dot{\theta}$$

FIG. 5 is a diagram for illustrating the influence amount of the suspension geometry, which is the element influencing the wheel speed. Reference symbol O denotes a momentary center of the suspension 20 in a side view of the vehicle. Reference symbol L denotes a distance from the momentary center O to the center of the wheel 10. The rotational angle of the carrier and the rotational angle of the wheel 10 caused by the longitudinal movement of the wheel 10 when the wheel 10 moves from a position where an outer edge is indicated by the solid line to a position where the outer edge is indicated by the broken line are respectively represented as $\theta$ and $\theta_w$. On this occasion, a translational component (component along the longitudinal direction of the vehicle) and a rotational component of the suspension geometry influence amount are respectively approximated as angular velocities $\omega_{sust}$ and $\omega_{susb}$ represented as Expression (8a). In Expression (8), $\tan \theta_t$ is equal to $\tan \theta_w$, and $dz_s/dt$ is a speed of the center of the wheel 10 in the z direction. The suspension geometry influence amount is approximated as an angular velocity $\omega_{sus}$, which is a sum of $\omega_{sust}$ and $\omega_{susb}$, represented as Expression (8b). On this occasion, $\theta_b$ is an anti-dive angle or an anti-lift angle.

$$\omega_{sust} = \frac{\tan\theta_t}{r}\dot{z}_s, \quad \omega_{susb} = \frac{1}{L}\dot{z}_s \tag{8a}$$

$$\omega_{sus} = \omega_{sust} + \omega_{susb} = \frac{\dot{z}_s}{r}\left(\tan\theta_t + \frac{r}{L}\right) = \frac{\tan\theta_b}{r}\dot{z}_s \tag{8b}$$

Figures 6A, 6B:
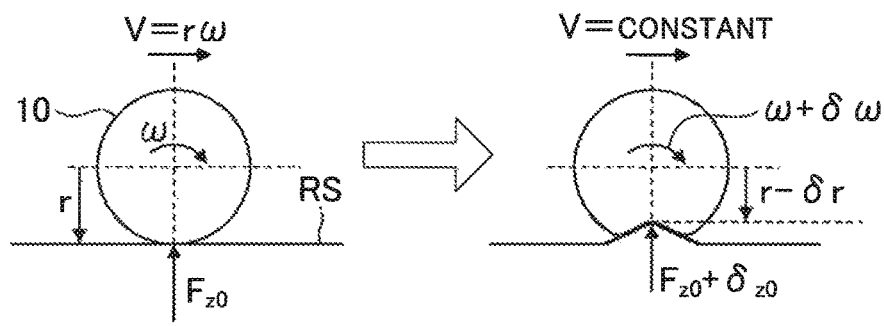
FIG. 6A and FIG. 6B are diagrams for illustrating an influence amount of a wheel rolling radius change, which is an element influencing the wheel speed.

FIG. 6A and FIG. 6B are diagrams for illustrating the influence amount of the wheel rolling radius change, which is the element influencing the wheel speed. Symbol V of FIG. 6A is a rotational speed of the wheel 10 when the road surface RS is flat, r is the rolling radius, and $\omega$ is an angular velocity. Symbol $F_{z0}$ is a force received by the wheel 10 from the road surface RS. On this occasion, as illustrated in FIG. 6B, a case where, when the road surface RS has a bump, $F_{z0}$ changes to $F_{z0}+\delta F_{z0}$, $\omega$ changes to $\omega+\delta\omega$, and the rolling radius r of the wheel 10 changes to r−δr while V is constant is considered.

On this occasion, Expression (9a) holds true for $\omega$. Moreover, the influence amount of the wheel rolling radius change is approximated as an angular velocity $\omega_{tire}$ represented as Expression (9b). In Expression (9b), $df_{tire}$ is a minute change in $F_{z0}$, and $k_t$ is the elastic modulus of the wheel 10. Moreover, $\eta$ is a ratio of a gradient relating to the load of the rolling radius of the wheel 10 with respect to a gradient relating to the load of a static load radius of the wheel 10.

$$\omega = \frac{V}{r}, \quad \frac{\partial\omega}{\partial r} = -\frac{V}{r^2} \tag{9a}$$

$$\omega_{tire} = -\frac{V}{r^2}dr = -\frac{V}{r^2}\frac{dr}{df_{tire}}df_{tire} = -\frac{V}{r^2}\frac{-\eta}{k_t}df_{tire} = \frac{V\eta}{k_t r^2}df_{tire} \tag{9b}$$

In consideration of the model including the above-mentioned three influence amounts influencing the wheel angular velocity, the wheel angular velocity $\omega$ is represented as Expression (10) based on Expressions (7), (8b), and (9b).

$$\omega = a_1 F_z + a_2 \dot{\theta} + a_3 \dot{z}_s \tag{10}$$

In Expression (10), coefficients $a_1$, $a_2$, and $a_3$ are different between the front wheel 10F and the rear wheel 10R. Those coefficients are represented as a row of Fr of Table 1 for the wheel angular velocity $\omega_f$ of the front wheel 10F and as a row of Rr of Table 1 for the wheel angular velocity $\omega_r$ of the rear wheel 10R. Suffixes "f" and "r" respectively represent parameters for the front wheel 10F and the rear wheel 10R. Moreover, $R_w$ denotes the rolling radius of the wheel. Moreover, $\theta_r$ denotes an anti-lift angle, and $\theta_f$ denotes an anti-dive angle.

TABLE 1

|    | $a_1$ | $a_2$ | $a_3$ |
|----|-------|-------|-------|
| Fr | $V\eta_f/K_{tf}R_{wf}^2$ | $-h/R_{wf}$ | $\tan\theta_f/R_{wf}$ |
| Rr | $V\eta_r/K_{tr}R_{wr}^2$ | $-h/R_{wr}$ | $\tan\theta_r/R_{wr}$ |

Thus, the wheel angular velocities $\omega_f$ and $\omega_r$ are Laplace-transformed to Expression (11). Expression (11) is further represented as a matrix form of Expression (12), which is 2×5 matrix B(s) (hereinafter abbreviated as matrix B).

$$\omega_f = a_{1f}F_{zf} + a_{2f}\dot{\theta} + a_{3f}\dot{z}_{sf} = a_{1f}F_{zf} + a_{2f}\theta s + a_{3f}z_{sf}s \tag{11}$$
$$\omega_r = a_{1r}F_{zr} + a_{2r}\dot{\theta} + a_{3r}\dot{z}_{sr} = a_{1r}F_{zr} + a_{2r}\theta s + a_{3r}z_{sr}s$$

$$\begin{pmatrix}\omega_f\\\omega_r\end{pmatrix} = \begin{bmatrix}a_{2f}s & a_{1f} & 0 & a_{3f}s & 0\\a_{2r}s & 0 & a_{1r} & 0 & a_{3r}s\end{bmatrix}\begin{pmatrix}\theta\\F_{zf}\\F_{zr}\\z_{sf}\\z_{sr}\end{pmatrix} = B(s)\begin{pmatrix}\theta\\F_{zf}\\F_{zr}\\z_{sf}\\z_{sr}\end{pmatrix} \tag{12}$$

The matrix B is a wheel speed influence element model matrix representing the wheel speed influence element model, and can be applied to the vehicle body state amount to calculate the wheel angular velocity.

Thus, as represented as Expression (13), a vector having the wheel angular velocities $\omega_f$ and $\omega_r$ as components is represented by using Expression (3) and Expression (12) as a result of application of a matrix AB, which is a product of the matrix B and the matrix A, to the road surface input (multiplication of the road surface input by the matrix AB). Moreover, as represented as Expression (14), a vector having the road surface inputs $z_{wf}$ and $z_{wr}$ as components is represented as a result of application of a matrix $(BA)^{-1}$, which is an inverse matrix of the matrix BA, to the wheel angular velocities (multiplication of the wheel angular velocities by the matrix $(BA)^{-1}$). Further, as represented as Expression (15), a vector having $\theta$, which is the vehicle body state amount, and the state variables $F_{zf}$, $F_{zr}$, $z_{sf}$, and $z_{sr}$ as components is acquired by sequentially applying the matrix $(BA)^{-1}$ and the matrix A to the wheel angular velocities (multiplying the wheel angular velocities sequentially by the matrix $(BA)^{-1}$ and the matrix A).

$$\begin{pmatrix}\omega_f\\\omega_r\end{pmatrix} = BA\begin{pmatrix}z_{wf}\\z_{wr}\end{pmatrix} \tag{13}$$

$$\begin{pmatrix}z_{wf}\\z_{wr}\end{pmatrix} = (BA)^{-1}\begin{pmatrix}\omega_f\\\omega_r\end{pmatrix} \tag{14}$$

$$\begin{pmatrix}\theta\\F_{zf}\\F_{zr}\\z_{sf}\\z_{sr}\end{pmatrix} = A(BA)^{-1}\begin{pmatrix}\omega_f\\\omega_r\end{pmatrix} \tag{15}$$

Thus, for example, $d\theta/dt$ (Laplace-transformed to $\theta s$) is acquired in accordance with Expression (16).

$$\dot{\theta} = \theta s \tag{16}$$
$$= A(1, :)\begin{pmatrix}z_{wf}\\z_{wr}\end{pmatrix}$$
$$= A(1, :)(BA)^{-1}\begin{pmatrix}\omega_f\\\omega_r\end{pmatrix}$$

Figure 7:
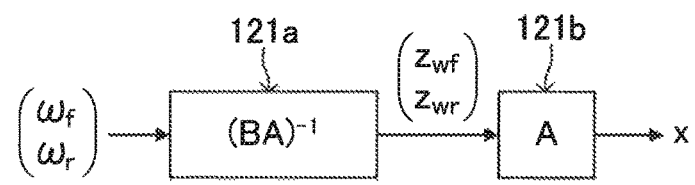
FIG. 7 is a diagram for illustrating a function of a first sprung vibration estimation unit in a form of control blocks.

FIG. 7 is a schematic diagram for illustrating a function of the first sprung vibration estimation unit 121 in a form of control blocks. As illustrated in FIG. 7, the first sprung vibration estimation unit 121 includes a road surface input calculation unit 121a and a vehicle body state amount calculation unit 121b. The road surface input calculation unit 121a is configured to multiply the vector having the wheel angular velocities $\omega_f$ and $\omega_r$ as the components by the inverse matrix $(BA)^{-1}$, thereby calculating estimated values of the road surface inputs $z_{wf}$ and $z_{wr}$. The vehicle body state amount calculation unit 121b is configured to multiply a vector having the estimated values of the road surface inputs $z_{wf}$ and $z_{wr}$ as the components by the matrix A, thereby calculating an estimated value of a vector x having θ, $F_{zf}$, $F_{zr}$, $z_{sf}$, and $z_{sr}$ as components. An estimated value of the pitch rate dθ/dt is calculated by subjecting the estimated value of the vector x to inverse Laplace transform. As the wheel angular velocities $\omega_f$ and $\omega_r$, an average of the wheel angular velocities detected by the wheel speed sensors 62FL and 62FR for the front left and right wheels and an average of the wheel angular velocities detected by the wheel speed sensors 62RL and 62RR for the rear left and right wheels may be used, respectively.

The first sprung vibration estimation unit 121 is configured to input the three wheel speed influence elements, thereby calculating the pitch rate, and thus the pitch rate can highly accurately be estimated.

As described above, the pitch rate calculated by the first sprung vibration estimation unit 121 is supplied to the vibration suppression driving force calculation unit 122. The vibration suppression driving force calculation unit 122 is configured to calculate the vibration suppression driving force (driving force having the magnitude of the product of the pitch rate and the gain α), which is the driving force acting in the direction of decreasing the pitch rate. This vibration suppression driving force is supplied to the addition unit 130 via the adjustment unit 123, and is added to the driver required driving force by the addition unit 130. As a result, the final target driving force is calculated, and the pitch vibration of the vehicle body 2 is suppressed.

The first sprung vibration estimation unit 121 is configured to estimate the sprung vibration (pitch rate) generated by the irregularities of the road surface based on the changes in the wheel speeds detected by the wheel speed sensors 62 (three influence amounts influencing the wheel speeds). In this case, the pitch rate is calculated based on the idea that the wheel speeds are changed by the above-mentioned three wheel speed influence elements. Thus, the vehicle body speed is assumed to be constant.

A main component of the wheel speed detected by the wheel speed sensor 62 is the vehicle body speed. Thus, the wheel speed detected by the wheel speed sensor 62 is a sum of the vehicle body speed and the above-mentioned three wheel speed influence elements. Therefore, in the case where the vehicle body speed changes, when the wheel speed including the component of the change in the vehicle body speed is input to the first sprung vibration estimation unit 121 to calculate the pitch rate, a calculation result includes the error (noise) caused by the change in the vehicle body speed. When the vibration suppression driving force is calculated based on the pitch rate including this error, the vibration suppression driving force is not appropriate, and the sprung vibration cannot thus be appropriately suppressed. For example, even when the sprung vibration is not actually generated, an unnecessary vibration suppression driving force is applied to the wheels 10RL and 10RR.

Moreover, the first sprung vibration estimation unit 121 is configured to use a serial combination of a high-pass filter and a low-pass filter to filter the input of the wheel speeds detected by the wheel speed sensors 62, thereby extracting wheel speed signals in the sprung resonance frequency band (e.g., 0.5 Hz to 3.5 Hz), and to use the filtered wheel speeds for the above-mentioned calculation. For example, the high-pass filter passes a frequency signal equal to or more than 0.5 Hz, and the low-pass filter passes a frequency signal equal to or less than 3.5 Hz. Therefore, a vehicle body speed change component included in the wheel speed is also filtered. When accelerator pedal is normally operated, a signal frequency of the vehicle body speed is lower than the sprung resonance frequency band, and the change component of the vehicle body speed can be removed by the filtering. However, when the driver carries out a quick accelerator pedal operation (e.g., a quick acceleration operation) or the like, the signal frequency of the vehicle body speed is increased, and the change component of the vehicle body speed cannot be removed by the above-mentioned filtering.

When an accurate vehicle body speed can be detected, a wheel speed enabling an appropriate estimation of the sprung vibration can be acquired by removing this vehicle body speed from the wheel speed. However, in general, the vehicle body speed is calculated based on the wheel speed, and the vehicle body speed cannot thus be separated from the wheel speed.

Thus, the sprung vibration damping control amount calculation unit 120 includes the integration unit 124 configured to calculate a value corresponding to the vehicle body speed. When the driver required driving force calculated by the driver required driving force calculation unit 110 is input to the integration unit 124, the integration unit 124 calculates a value acquired by integrating the driver required driving force. The driver required driving force represents a value acquired by multiplying a driver required acceleration/deceleration by the mass of the vehicle. Thus, a value corresponding to the vehicle body speed (hereinafter referred to as calculated vehicle body speed) can be acquired by integrating the driver required driving force. The integration unit 124 may be configured to calculate the calculated vehicle body speed by also considering a required braking force generated by a brake pedal operation of the driver. The calculated vehicle body speed includes a steady-state error (DC component), but the steady-state error is cut by a high-pass filter provided in an input stage of the second sprung vibration estimation unit 125.

The integration unit 124 supplies the calculated vehicle body speed to the second sprung vibration estimation unit 125. The second sprung vibration estimation unit 125 is the same calculation device as the first sprung vibration estimation unit 121, and is configured to use the calculated vehicle body speed as an input value, and use the same calculation method as that of the first sprung vibration estimation unit 121, thereby calculating the pitch rate representing the magnitude of the sprung vibration. In other words, the calculated vehicle body speed is input to the second sprung vibration estimation unit 125 as the input value in place of the wheel angular velocities of the front and rear wheels, which are the input values of the first sprung vibration estimation unit 121. In this case, the second sprung vibration estimation unit 125 is configured to convert the calculated vehicle body speed into the wheel angular velocity, and the converted wheel angular velocity is input to the second sprung vibration estimation unit 125 as the respective wheel angular velocities of the front and rear wheels. Then, the second sprung vibration estimation unit 125 calculates a pitch rate by using the same calculation method as that of the first sprung vibration estimation unit 121. This pitch rate calculated by the second sprung vibration estimation unit 121 is referred to as vehicle body speed pitch rate.

The vehicle body speed pitch rate is generated by the change in the vehicle body speed, and thus corresponds to the noise which is caused by the change in the vehicle body speed and is included in the pitch rate estimated by the first sprung vibration estimation unit 121. Therefore, the vehicle body speed pitch rate corresponds to the error indication value according to the present invention. Thus, when the vehicle body speed pitch rate is input to the determination unit 126, the determination unit 126 compares the vehicle body speed pitch rate with a threshold. The determination unit 126 outputs the cutoff command to the adjustment unit 123 when the vehicle body speed pitch rate is more than the threshold. When the relationship in the magnitude between the error indication value and the threshold is discussed in this specification, the absolute value of the error indication value is used. Moreover, the determination unit 126 is configured to hold, when the determination unit 126 determines that the error indication value (in this example, the absolute value of the vehicle body speed pitch rate) is more than the threshold, the determination result for a predetermined period. As a result, even when the vehicle body speed pitch rate pulsates toward the positive and negative directions so that the error indication value becomes temporarily less than the threshold, the determination result that the noise included in the pitch rate estimated by the first sprung vibration estimation unit 121 is large can be maintained.

As a result, the vibration suppression driving force calculated by the vibration suppression driving force calculation unit 122 comes not to be supplied as the pitch suppression driving force to the addition unit 130. Thus, the target driving force becomes equal to the driver required driving force. As a result, when the noise included in the pitch rate estimated by the first sprung vibration estimation unit 121 is large, the sprung vibration damping control using the vibration suppression driving force is temporarily stopped.

In the configuration of this embodiment, whether or not the vibration suppression driving force is added to the driver required driving force is alternatively selected, but, in place of this configuration, there may be provided such a configuration that the magnitude of the vibration suppression driving force is corrected depending on the magnitude of the error, which is the magnitude of the vehicle body speed pitch rate in this case. For example, the determination unit 126 stores a correction coefficient map in which a correction coefficient K (0≤K≤1) that is decreased as the vehicle body speed pitch rate is increased is set, and is configured to refer to the correction coefficient map to set the correction coefficient K depending on the vehicle body speed pitch rate, and to supply the set correction coefficient K to the adjustment unit 123. The adjustment unit 123 is configured to multiply the vibration suppression driving force calculated by the vibration suppression driving force calculation unit 122 by the correction coefficient K, and to supply the multiplication result as the pitch suppression driving force to the addition unit 130.

With the above-mentioned driving force control device for a vehicle according to this embodiment, the pitch rate of the vehicle body 2 is calculated by estimation by the first sprung vibration estimation unit 121 using the wheel speed influence element model matrix representing the wheel speed influence element model reflecting the three wheel speed influence elements, which change the wheel speed by the road surface input. Therefore, the pitch rate of the vehicle body 2 can be accurately estimated from the wheel speeds. The estimated calculation of the pitch rate of the vehicle body 2 assumes that the vehicle body speed is constant. Thus, when the vehicle body speed is stable, the target driving force can be set by adding the pitch suppression driving force corresponding to the pitch rate to the driver required driving force, thereby appropriately suppressing the pitching of the vehicle body 2.

On the other hand, when the vehicle body speed changes, the estimated calculation of the pitch rate includes the error. Thus, the vehicle body speed is estimated by the integration unit 124 in order to estimate the magnitude of the error caused by the change in the vehicle body speed, and the pitch rate (vehicle body speed pitch rate) of the vehicle body 2 generated by the change in the vehicle body speed is calculated by estimation by the second sprung vibration estimation unit 125. The estimated calculation is implemented in the same way as the estimated calculation carried out by the first sprung vibration estimation unit 121. Thus, the error included in the pitch rate estimated by the first sprung vibration estimation unit 121 can be appropriately estimated.

Then, when the vehicle body speed pitch rate representing the magnitude of the error is more than the threshold, the cutoff command is output from the determination unit 126 to the adjustment unit 123, and the vibration suppression driving force is not added to the driver required driving force. Alternatively, the vibration suppression driving force is corrected to decrease as the vehicle body speed pitch rate is increased. Thus, inappropriate sprung vibration damping control based on the error can be prevented.

Moreover, the driving force is actually generated by the wheel 10, and thereby the vehicle body 2 pitches, after the driver required driving force is calculated. Namely, the vehicle body 2 pitches with delay with respect to calculation of the driver required driving force. However, according to this embodiment, the output signal of the second sprung vibration estimation unit 125 is advanced in the phase with respect to the output signal of the first sprung vibration estimation unit 121. Therefore, the sprung vibration damping control can be appropriately suspended, or the sprung vibration damping control amount can be appropriately corrected without a compensation of the control delay.

<First Modified Embodiment>

Figure 8:
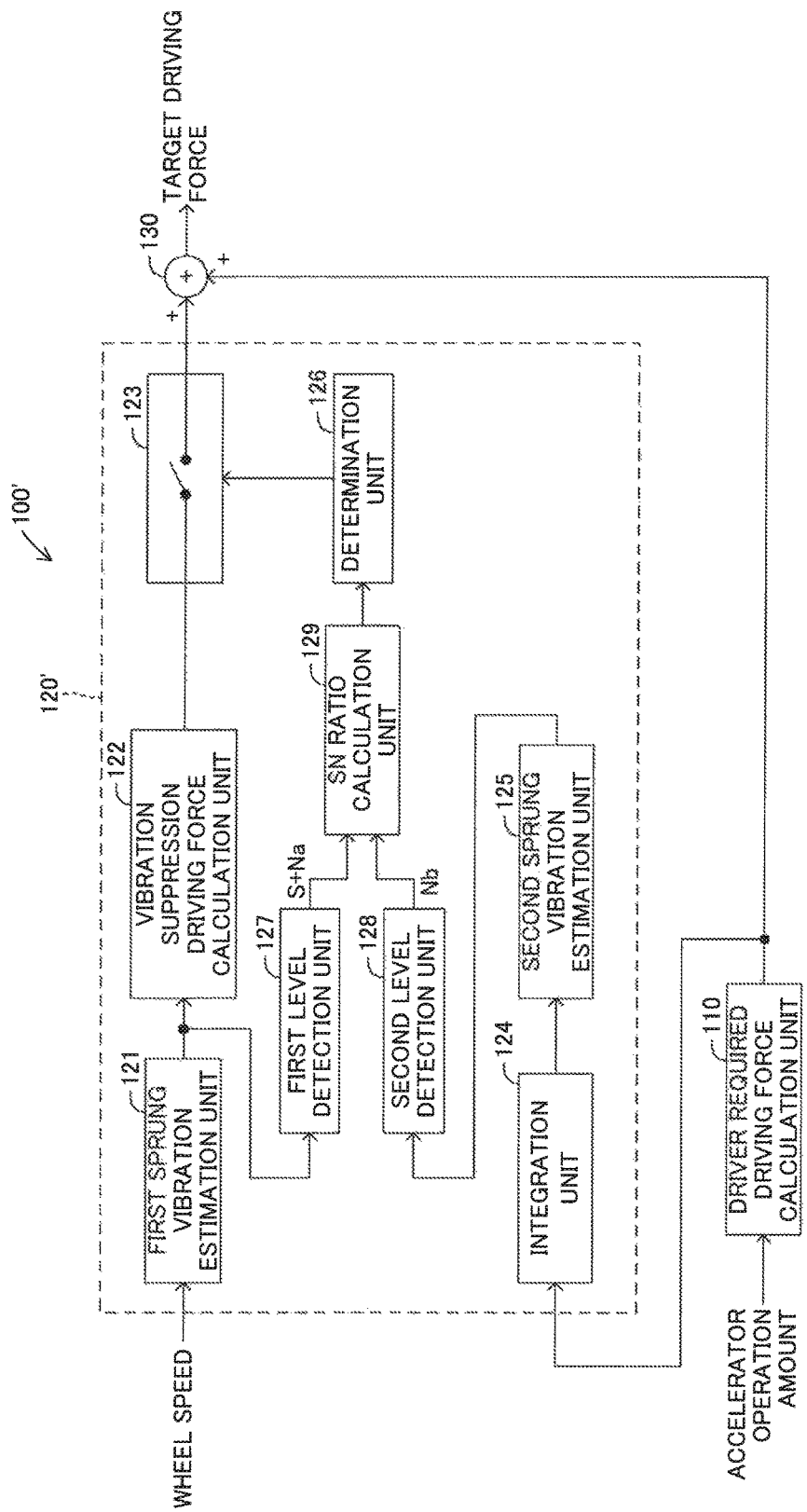
FIG. 8 is a functional block diagram for illustrating a target driving force calculation unit according to a first modified embodiment.

A description is now given of a modified embodiment of the sprung vibration damping control amount calculation unit 120. FIG. 8 is a functional block diagram for illustrating a target driving force calculation unit 100' including a sprung vibration damping control amount calculation unit 120' according to the first modified embodiment.

The sprung vibration damping control amount calculation unit 120' is configured so that a first level detection unit 127, a second level detection unit 128, and an SN ratio calculation unit 129 are further added to the sprung vibration damping control amount calculation unit 120 according to the above-mentioned embodiment.

Figure 9:
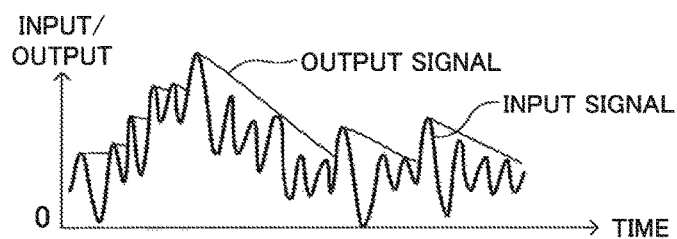
FIG. 9 is a waveform graph for showing an input signal and an output signal of a first level detection unit.

The first level detection unit 127 is configured to carry out envelope detection, which is processing of extracting only an envelope of a time series of the signal (pitch rate) output by the first sprung vibration estimation unit 121. FIG. 9 is a graph for showing waveforms of an input signal (thick line) and an output signal (thin line) of the first level detection unit 127. The output signal of the first level detection unit 127 represents a level of the pitch rate including the pitch rate (essential signal S to be detected) generated by the above-mentioned three elements influencing the wheel speeds and the pitch rate (signal Na constituting the noise) generated by the change in the vehicle body speed. The first level detection unit 127 is configured to output the envelope detection signal to the SN ratio calculation unit 129.

Figure 10:
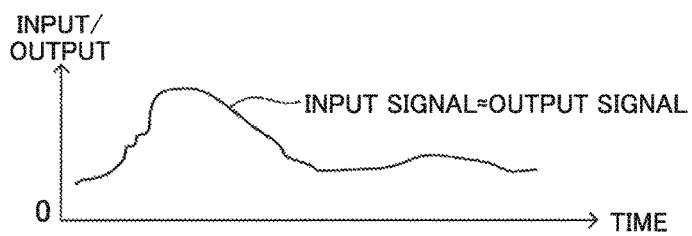
FIG. 10 is a waveform graph for showing an input signal and an output signal of a second level detection unit.

The second level detection unit 128 is configured to carry out envelope detection, which is processing of extracting only an envelope of a time series of the signal (vehicle body speed pitch rate) output by the second sprung vibration estimation unit 125. FIG. 10 is a graph for showing waveforms an input signal and an output signal of the second level detection unit 128. In this case, the frequency of the vehicle body speed pitch rate is low, and the input signal and the output signal are almost the same (in FIG. 10, shown as the same). The output signal of the second level detection unit 128 represents a level of the pitch rate generated by the change in the vehicle body speed, and constitutes a noise Nb for the sprung vibration damping control. The second level detection unit 128 is configured to output the envelope detection signal to the SN ratio calculation unit 129.

Figure 11:
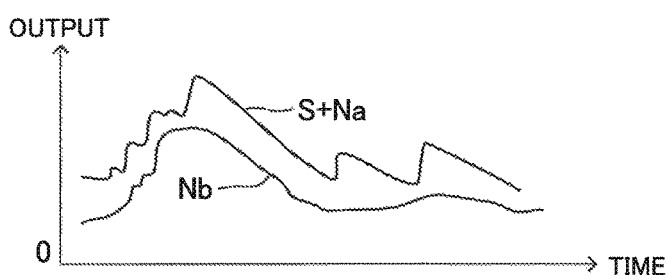
FIG. 11 is a waveform graph for showing envelope detection signals input to an SN ratio calculation unit.

FIG. 11 is a graph for showing the envelope detection signals input to the SN ratio calculation unit 129. The SN ratio calculation unit 129 is configured to calculate the SN ratio (SN) in accordance with Expression (17) based on the value (S+Na) of the envelope detection signal input from the first level detection unit 127 and the value (Nb) of the envelope detection signal input from the second level detection unit 128.

$$SN=(S+Na-Nb)/Nb \qquad (17)$$

Figure 12:
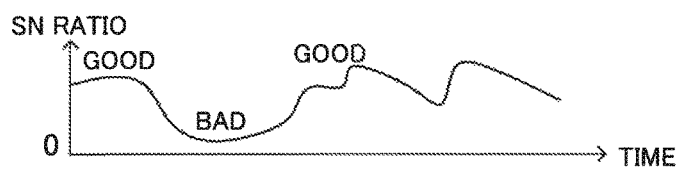
FIG. 12 is a graph for showing a transition of an SN ratio.

FIG. 12 is a graph for showing a transition of the SN ratio.

The SN ratio (SN) corresponds to the error indication value according to the present invention. It can be assumed that the error becomes larger as the SN ratio (SN) becomes smaller. The SN ratio calculation unit 129 is configured to output the calculated SN ratio (SN) to the determination unit 126. The determination unit 126 is configured to compare the SN ratio input from the SN ratio calculation unit 129 and a threshold set in advance with each other, and to output the cutoff command to the adjustment unit 123 when the SN ratio is less than the threshold.

Also in this modified embodiment, the magnitude of the pitch suppression driving force may be corrected depending on the magnitude of the SN ratio. For example, the determination unit 126 stores a correction coefficient map in which a correction coefficient K (0≤K≤1) that is decreased as the SN ratio is decreased is set, and is configured to refer to the correction coefficient map to set the correction coefficient K depending on the SN ratio, and to supply the set correction coefficient K to the adjustment unit 123. The adjustment unit 123 is configured to multiply the vibration suppression driving force calculated by the vibration suppression driving force calculation unit 122 by the correction coefficient K, and to supply the multiplication result as the pitch suppression driving force to the addition unit 130.

According to this modified embodiment, the magnitude of the error included in the pitch rate estimated by the first sprung vibration estimation unit 121 is estimated by using the SN ratio, and thus the magnitude of the error can be estimated more appropriately. Thus, the sprung vibration damping control can be carried out more appropriately.

<Second Modified Embodiment>

Figure 13:
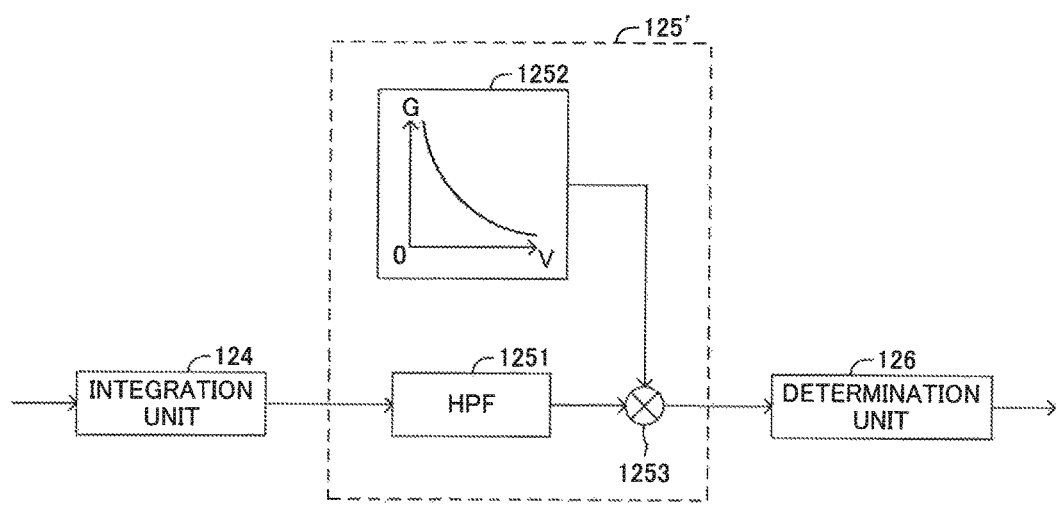
FIG. 13 is a functional block diagram for illustrating a second sprung vibration estimation unit according to a second modified embodiment.

A description is now given of a modified embodiment of the second sprung vibration estimation unit 125. FIG. 13 is a functional block diagram of a second sprung vibration estimation unit 125' according to a second modified embodiment provided in place of the second sprung vibration estimation unit 125 according to the above embodiment. The second sprung vibration estimation unit 125 according to the above embodiment uses the same calculation method as that of the first sprung vibration estimation unit 121 to calculate the pitch rate representing the magnitude of the sprung vibration. However, this calculation method has a high calculation load. The second sprung vibration estimation unit 125' according to the second modified embodiment has a simple configuration so as to decrease the calculation load compared with the second sprung vibration estimation unit 125 (first sprung vibration estimation unit 121) according to the above embodiment.

The second sprung vibration estimation unit 125' includes a high-pass filter 1251, a gain calculation unit 1252, and a multiplication unit 1253. The high-pass filter 1251 is a high-pass filter in which a filter having a characteristic equivalent to that of the input filter included in the first sprung vibration estimation unit 121 (second sprung vibration estimation unit 125) is implemented in a simple manner. The acceleration/deceleration operation of the driver does not include many frequency components equal to or more than 3.5 Hz. Moreover, what is eventually necessary in the second sprung vibration estimation unit 125' is the error caused by the change in the vehicle body speed included in the sprung vibration estimated by the first sprung vibration estimation unit 121. Thus, a value representing the magnitude of the change component in the calculated vehicle body speed only needs to be detected, and the phase does not need to be considered. When the sprung vibration is estimated based on the three wheel speed influence elements as in the embodiment, the phase needs to be considered, and, in this case, both the high-pass filter and the low-pass filter are necessary, resulting in the high calculation load. Consequently, the second sprung vibration estimation unit 125' has the configuration without the low-pass filter. The calculated vehicle body speed supplied from the integration unit 124 is input to the high-pass filter 1251. The high-pass filter 1251 is configured to cut frequency signals less than a lower limit value (e.g., 0.5 Hz) of the sprung resonance frequency band, and to pass only the change component of the calculated vehicle body speed. Thus, the high-pass filter 1251 is configured to output a value representing the component corresponding to an unnecessary vehicle body speed change included in the sprung vibration estimated by the first sprung vibration estimation unit 121. The high-pass filter 1251 is configured to output a signal the amplitude of which is increased as the change in the calculated vehicle body speed is increased.

The gain calculation unit 1252 stores a vehicle speed gain map in which a vehicle speed gain characteristic is set so as to output a signal the magnitude of which is equivalent to that of the first sprung vibration estimation unit 121. This vehicle speed gain characteristic is a gain characteristic in the case where the sprung vibration is estimated by the first sprung vibration estimation unit 121 based on the three wheel speed influence elements, and is simply defined by using the vehicle body speed.

The sprung vibration (pitch rate) calculated by the first sprung vibration estimation unit 121 is determined depending on the frequency characteristic and the vehicle body speed. When the calculated vehicle body speed calculated by the integration unit 124 is input to the above-mentioned high-pass filter 1251, the high-pass filter 1251 outputs the signal representing the change component of the calculated vehicle body speed. The gain of this calculated vehicle body speed does not change greatly with respect to the frequency. In other words, the calculated vehicle body speed has a flat frequency characteristic. Therefore, when the gain characteristic equivalent to that of the first sprung vibration estimation unit 121 is intended to be achieved, the gain can be set depending only on the vehicle body speed without considering the frequency characteristic. This vehicle speed gain map is set to a characteristic corresponding to the gain that changes depending on the vehicle body speed when the first sprung vibration estimation unit 121 estimates the sprung vibration based on the three wheel speed influence elements.

When the wheel 10 passes over the irregularities of the road surface, the input from the road surface acts on the vehicle body 2 via the suspensions 20, and the vehicle body 2 thus vibrates. The vibration of the vehicle body 2 includes a pitch vibration component and a bounce vibration component. A ratio of the pitch vibration component is increased as the vehicle body speed V is decreased, and the ratio of the pitch vibration component is decreased as the vehicle body speed V is increased. The reason for this is that, for example, when a period (referred to as passage period) from a passage of the front wheel 10F over irregularities to a passage of the rear wheel 10R over the irregularities is long, the vehicle body 2 tends to pitch, but, when the passage period is short, at a moment the vehicle body 2 starts to pitch, the rear wheel 10R passes over the irregularities, and the pitch motion changes to a bounce motion. Thus, the vehicle speed gain map has such a characteristic of setting a vehicle speed gain G that is decreased as the vehicle body speed V is increased. In this embodiment, the vehicle speed gain G is set so as to exponentially decrease as the vehicle body speed V is increased.

In this case, as the vehicle body speed V, a vehicle body speed used in various control devices in the vehicle 1 (that is, a detected vehicle speed of a vehicle speed sensor configured to calculate the vehicle body speed from the detection values of the four wheel speed sensors 62, e.g., a meter vehicle speed used for a speedometer) is used. The gain calculation unit 1252 is configured to acquire vehicle speed information via a controller area network (CAN) (not shown), and to set the vehicle speed gain G depending on the vehicle body speed V. The vehicle body speed V may be the calculated vehicle body speed calculated by the integration unit 124.

The output signal of the high-pass filter 1251 and the vehicle speed gain G calculated by the gain calculation unit 1252 are input to the multiplication unit 1253. The multiplication unit 1253 multiplies the magnitude of the output signal (magnitude of the change component of the calculated vehicle body speed) of the high-pass filter 1251 by the vehicle speed gain G, and outputs a multiplication result as the error indication value to the determination unit 126. The determination unit 126 is configured to output the cutoff command or the correction coefficient K to the adjustment unit 123 based on the error indication value.

With this second modified embodiment, the calculation load applied on the second sprung vibration estimation unit 125' can be decreased.

In the above, the driving force control device for a vehicle according to this embodiment and modified embodiments has been described. However, the present invention is not limited to the above-mentioned embodiment and modified embodiments, and various changes are possible within the range not departing from the object of the present invention.

What is claimed is:

1. A driving force control device for a vehicle, comprising:
    wheel speed sensor for detecting a wheel speed; and
    at least one processor, the at least one processor configured for:
        estimating, based on the wheel speed, a sprung vibration to be generated in a pitch direction of a vehicle body due to an input from a road surface;
        calculating a vibration suppression driving force for suppressing the estimated sprung vibration;
        calculating a target driving force acquired by adding the vibration suppression driving force to a driver required driving force to be set depending on a driver required acceleration/deceleration;
        controlling a driving force to be generated on a wheel in accordance with the target driving force;
        calculating, based on the driver required acceleration/deceleration, an error indication value representing a magnitude of an error, which is included in an estimation of the sprung vibration and is generated by a change in a vehicle body speed; and
        decreasing, based on the error indication value, the vibration suppression driving force to be added to the driver required driving force in a case where the error indication value is greater than a threshold.

2. A driving force control device for a vehicle according to claim 1, wherein, the at least one processor is further configured to:
    calculate a pitch rate of the vehicle body as the sprung vibration, and
    calculate, based on the calculated pitch rate, the vibration suppression driving force proportional in a magnitude to the pitch rate.

3. A driving force control device for a vehicle according to claim 2, wherein, the at least one processor is further configured to:
    integrate a value representing the driver required acceleration/deceleration, thereby calculating a value corresponding to the vehicle body speed, and to calculate, as the error indication value, a pitch rate of the vehicle body generated by the change in the vehicle body speed, based on a value corresponding to the calculated vehicle body speed.

4. A driving force control device for a vehicle according to claim 2, wherein, the at least one processor is further configured to:
    integrate a value representing the driver required acceleration/deceleration, thereby calculating a value corresponding to the vehicle body speed;
    extract a change component of a value corresponding to the calculated vehicle body speed; and
    multiply a magnitude of the change component by a vehicle speed gain, which is decreased as the vehicle body speed is increased, to thereby calculate the error indication value.

5. A driving force control device for a vehicle according to claim 1, wherein, the at least one processor is further configured to:
    calculate a pitch rate of the vehicle body as the sprung vibration;
    detect a level of the pitch rate calculated using the sprung vibration;
    integrate a value representing the driver required acceleration/deceleration, thereby calculating a value corresponding to the vehicle body speed, calculating, based on a value corresponding to the calculated vehicle body speed, a pitch rate of the vehicle body generated by the change in the vehicle body speed, and detecting a level of the calculated pitch rate; and
    calculate an SN ratio acquired by dividing a value, which is acquired by subtracting a second value representing the level of the pitch rate detected from a first value representing the level of the pitch rate, by the second value;
    acquire the error indication value, which corresponds to the SN ratio, and the error can be estimated to become larger as the error indication value becomes smaller.

6. A driving force control device for a vehicle according to claim 1, wherein the at least one processor is further configured to prevent the vibration suppression driving force from being added to the target driving force when the error indication value is more than a threshold.

7. A driving force control device for a vehicle according to claim 1, wherein the at least one processor is further configured to correct the vibration suppression driving force to be added to the driver required driving force so that the vibration suppression driving force is decreased as the error indication value is increased.

8. A driving force control device for a vehicle according to claim 2, wherein the at least one processor is further configured to prevent the vibration suppression driving force from being added to the target driving force when the error indication value is more than a threshold.

9. A driving force control device for a vehicle according to claim 3, wherein the at least one processor is further configured to prevent the vibration suppression driving force from being added to the target driving force when the error indication value is more than a threshold.

10. A driving force control device for a vehicle according to claim 4, wherein the at least one processor is further configured to prevent the vibration suppression driving force from being added to the target driving force when the error indication value is more than a threshold.

11. A driving force control device for a vehicle according to claim 5, wherein the at least one processor is further configured to prevent the vibration suppression driving force from being added to the target driving force when the error indication value is more than a threshold.

* * * * *